(No Model.)
W. C. GILMORE.
HAND GARDEN PLOW.
No. 528,937.
Patented Nov. 13, 1894.
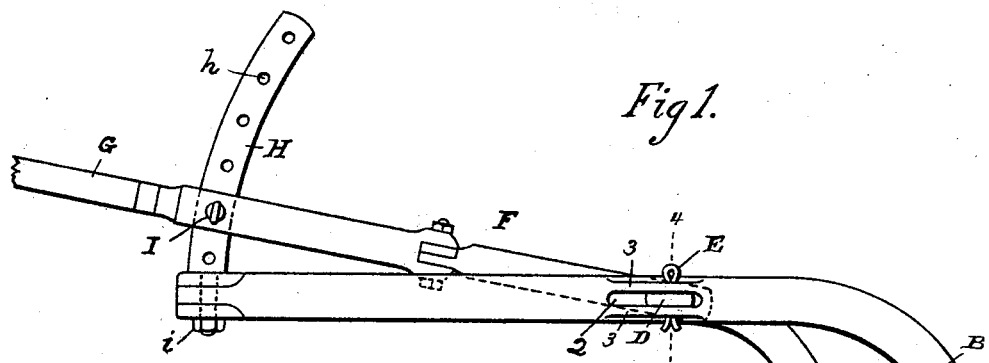
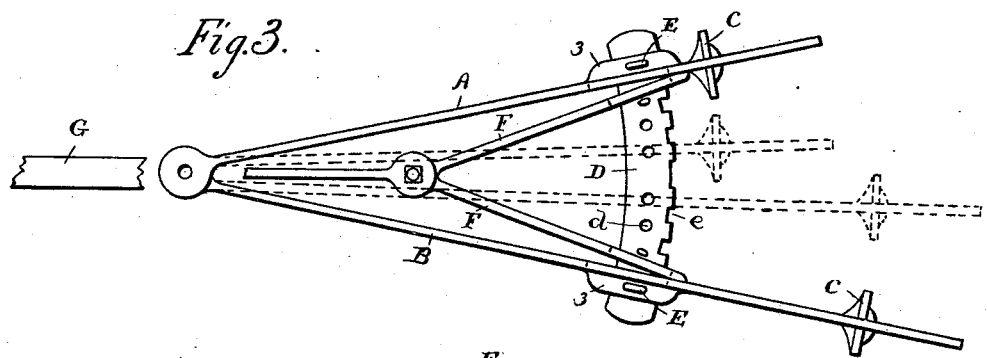
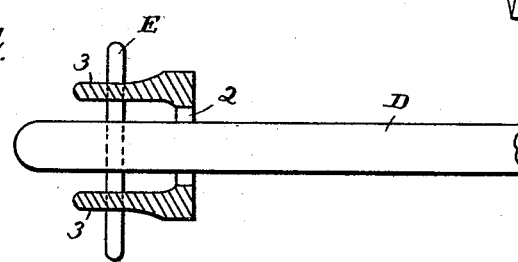
WITNESSES.
INVENTOR.
William C. Gilmore
per E. H. Gleason
ATTORNEY.

UNITED STATES PATENT OFFICE.

WILLIAM CONVERSE GILMORE, OF LETTS, ASSIGNOR TO L. VAN HORN & SNYDER, OF LOUISA COUNTY, IOWA.

HAND GARDEN-PLOW.

SPECIFICATION forming part of Letters Patent No. 528,937, dated November 13, 1894.

Application filed June 2, 1894. Serial No. 513,329. (No model.)

*To all whom it may concern:*

Be it known that I, WILLIAM CONVERSE GILMORE, a citizen of the United States, residing at Letts, in the county of Louisa and State of Iowa, have invented certain new and useful Improvements in Hand Garden-Plows; and I do hereby declare the following to be a full, clear, and exact description of the invention, such as will enable others skilled in the art to which it appertains to make and use the same.

My invention aims to provide an agricultural implement which is adjustable in its several parts and having a draft bar vertically adjustable at its front end for the dual purpose of regulating the pitch of the cultivator shovels and adapting the elevation of the draft bar to the height of the person dragging the device over the field.

The implement is essentially a hand tool, hence the advantage of having the draft bar adjustable in the manner set forth.

A further object of the invention is simplicity in the assemblage and disposition of the parts whereby the various adjustments can be effected, the cultivator beams separated or brought together, and the draft bar moved up and down at the outer end, in a moment's notice and without vexation and annoyance.

The improvement consists of the novel features and the peculiar construction and combination of the parts which will be hereinafter more fully described and claimed and which are shown in the annexed drawings, in which—

Figure 1 is a side elevation of the invention, the front end of the draft bar being broken away. Fig. 2 is a detail view showing the manner of attaching the spreader bar to the notched curved bar. Fig. 3 is a top plan view of the implement, the curved vertical bar being removed and the draft bar being broken away in parts. Fig. 4 is a transverse sectional view of a cultivator beam on the line 4—4 of Fig. 1.

Referring to the drawings, A and B represent cultivator beams which are pivotally connected together at their forward ends and have the rear ends curved downward to provide standards to which are attached shovels C in any desired manner so as to be reversed, interchanged and adjusted in the usual manner. One of the beams is relatively longer than the other to bring the shovels C, the one in advance of the other which is the preferable arrangement. Lateral openings 2 are provided in the beams in coincident relation to admit of the passage of the curved bar D by means of which the beams A and B are held at a fixed relative distance apart. Lateral extensions or ribs 3 border the edges of the openings and serve to strengthen the beams and form a support for the pins E which secure the beams in the located position.

The bar D is flat and curved on the arc of a circle whose center coincides with the pivot about which the beams A and B move. A series of openings $d$ in the length of the bar receive the pins E by which the beams A and B are secured in the adjusted position. The rear edge of the bar has a series of notches $e$ by means of which the spreader bars F are retained in the required position.

The draft bar G connects at its rear end by a pivotal joint with the forward ends of the spreader bars F and is adjustably attached to a vertically disposed bar H which curves slightly in its length on the arc of a circle struck from the bar D as a center. The curved bar H has a series of openings $h$ in its length one of which is engaged by a pin I which connects the draft bar G with the said bar H. The lower end of the bar H passes through the flattened and overlapping ends of the beams A and B and constitutes the pivot which connects the said beams together and on which they move. The nut $i$ on the projecting end secures the bar H in place.

The spreader bars F, two in number, are pivotally connected at their forward ends with the rear end of the draft bar G and have an opening $f$ in the rear end to receive the bar D. These openings $f$ are sufficiently large to admit of the front ends of the bars F moving vertically and the bars moving longitudinally to disengage them from the notches $e$ when it is required to separate or bring the rear ends of the said bars F together.

The plow or cultivator is drawn over the ground either by hand or otherwise by the application of the draft to the draft bar G, the shovels C tilling the soil in the usual manner.

If it be required to elevate the front end of the draft bar either to change the pitch of the shovels or adapt it to the height of the person, the pin I is removed and the draft bar moved up or down on the bar H as required. After the proper adjustment is attained the pin I is replaced passing through the registering holes in the draft and curved bars. By removing the pins E the beams A and B can be moved laterally to bring the shovels closer together or separate them as required. When the pin I is moved the draft bar can be moved longitudinally sufficiently far to unseat the spreader bars from the notches e thereby providing for the proper adjustment of the same to conform to the adjustments of the other parts as will be readily understood.

Having thus described my invention, what I claim, and desire to secure by Letters Patent, is—

1. The combination with the beams pivotally connected together at their front ends and having lateral openings between their ends from which project outwardly pairs of ribs which are vertically apertured, of a curved bar passing laterally through the said openings and between the pairs of ribs and provided in its length with a series of openings, pins adapted to pass through the opening in the ribs and the openings in the transverse bar, a draft bar having adjustable connection at its rear end with the transverse bar, and means for adjustably connecting the front end of the beams with the said draft bar at a point forward of its connection with the transverse bar, substantially as set forth.

2. In combination, plow beams pivotally connected together at their front ends and having lateral openings between their front and rear ends, a transverse bar provided with a series of openings to adjustably connect the rear ends of the beams together and having a series of notches in its rear edge, spreader bars pivotally connected at their front ends and having openings in their rear ends to receive the aforesaid transverse bar and engage with the notches in the rear edge thereof, the draft beam connected with the front ends of the spreader bars, and having a vertical opening a short distance from its rear end, and a curved bar extending vertically from the pivotal ends of the beam and passing through the vertical openings in the draft bar, and adjustably connected therewith, substantially as set forth.

3. The herein specified hand plow or cultivator composed of two beams pivotally connected together at their front ends, a curved bar, provided with a series of openings, rising vertically from the said beam and having its lower end constituting the pivotal connection of the said beams, a curved bar, having a series of openings and a series of notches in its rear edge, passing laterally through openings in the beam provided between their front and rear ends, means for adjustably connecting the beams with the said transverse bar, spreader bars pivotally connected together at their front ends and having openings in their rear ends to receive the said transverse bar and adapted to form or make adjustable connection with the notches in its rear edge, and a draft bar pivotally connected with the front ends of the spreader bars and having a vertically disposed opening to receive the curved bar projecting vertically from the beam and adapted to make adjustable connection therewith, substantially as described for the purpose specified.

In testimony whereof I have affixed my signature in presence of two witnesses.

WILLIAM CONVERSE GILMORE.

Witnesses:
J. T. CODER,
G. W. REICHLEY.